US008855656B2

(12) United States Patent
Michel

(10) Patent No.: US 8,855,656 B2
(45) Date of Patent: Oct. 7, 2014

(54) POWER CONSUMPTION REDUCTION WITHIN A TELECOMMUNICATION NETWORK OPERATING WITH DIFFERENT RADIO ACCESS TECHNOLOGIES

(75) Inventor: Juergen Michel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/637,769

(22) PCT Filed: Mar. 29, 2010

(86) PCT No.: PCT/EP2010/054126
§ 371 (c)(1),
(2), (4) Date: Feb. 15, 2013

(87) PCT Pub. No.: WO2011/120554
PCT Pub. Date: Oct. 6, 2011

(65) Prior Publication Data
US 2013/0143580 A1    Jun. 6, 2013

(51) Int. Cl.
*H04W 74/00* (2009.01)
*H04B 1/38* (2006.01)
*H04W 52/02* (2009.01)
*H04W 88/08* (2009.01)
*H04W 24/00* (2009.01)
*H04W 36/08* (2009.01)
*H04W 88/06* (2009.01)

(52) U.S. Cl.
CPC .......... *H04W 52/0206* (2013.01); *H04W 88/08* (2013.01); *H04W 74/00* (2013.01); *H04W 24/00* (2013.01); *H04W 36/08* (2013.01); *H04W 88/06* (2013.01); *Y02B 60/50* (2013.01)
USPC ............................ 455/446; 455/453; 455/574

(58) Field of Classification Search
CPC . H04W 52/0206; H04W 24/00; H04W 36/08; H04W 88/06; H04W 88/08; H04W 74/00; H04W 16/08; H04W 16/32; H04W 52/02
USPC ................. 455/436, 443–450, 453, 574, 422; 370/329
See application file for complete search history.

(56) References Cited

U.S. PATENT DOCUMENTS 8,554,224 B2 *   10/2013   Soliman et al. ............... 455/436
2009/0106571 A1 *   4/2009   Low et al. ..................... 713/310
2014/0052864 A1 *   2/2014   Van Der Linden et al. ... 709/226

FOREIGN PATENT DOCUMENTS

EP          2 117 279 A1    11/2009
WO    WO 2009/068138 A1     6/2009
WO    WO 2009/140988 A1    11/2009

OTHER PUBLICATIONS

Anonymous, "Method to increase power efficiency in a mixed GSM/UMTS network", Research Disclosure, Mason Publications, Hampshire, Great Britain, Jul. 1, 2003, vol. 471, No. 88, 5 pgs.

(Continued)

*Primary Examiner* — Nizar Sivji
(74) *Attorney, Agent, or Firm* — Harrington & Smith

(57) ABSTRACT

A method provides radio access within a specific area of a telecommunication network. The specific area is served by first base station(s) assigned to a first RAT and by second base station(s) assigned to a second RAT. Compared to the second RAT the first RAT is a legacy RAT. The method includes (a) determining the amount of radio data traffic within the specific area, (b) comparing the determined amount with a first radio data traffic capacity, and (c) if the first radio data traffic capacity is larger than the determined amount, transferring the second base station(s) into a predefined operational state, in which the second base station(s) has a reduced electric power consumption, and serving the specific area exclusively by the first base station(s). A first base station and a second base station are adapted to carry out the method.

11 Claims, 1 Drawing Sheet

(56) References Cited

OTHER PUBLICATIONS

R3-092478, 3GPP TSG-RAN WG3 #65bis, Miyazaki, Japan, Oct. 12-15, 2009, Ericsson, "Considerations on energy saving solutions in heterogeneous networks", 2 pgs.

R3-100162, 3GPP TSG-RAN WG3#66bis, Valencia, Spain, Jan. 18-22, 2010, Huawei, "Overview to LTE energy saving solutions to cell switch off/on", 5 pgs.

\* cited by examiner

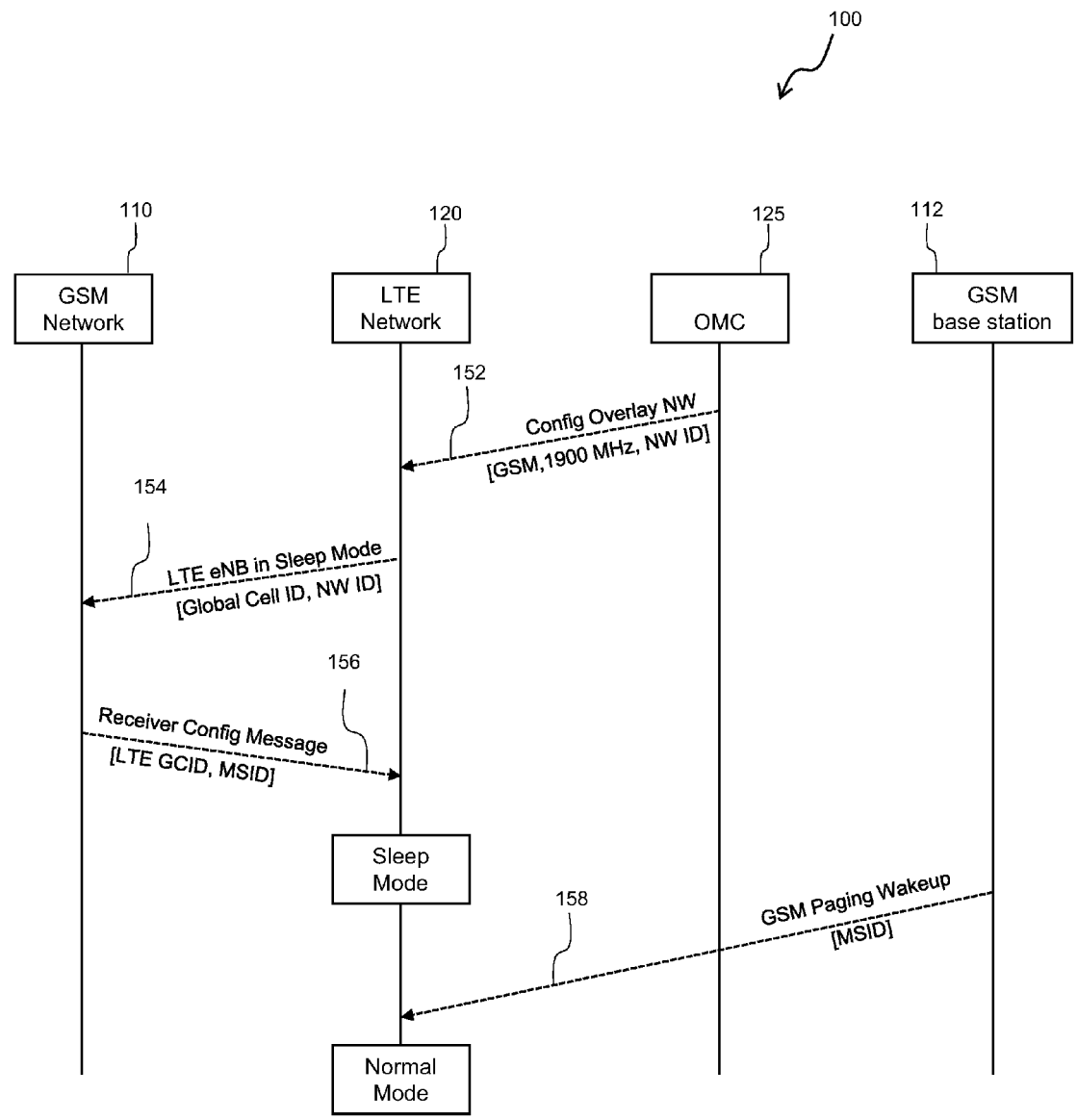

POWER CONSUMPTION REDUCTION WITHIN A TELECOMMUNICATION NETWORK OPERATING WITH DIFFERENT RADIO ACCESS TECHNOLOGIES

FIELD OF INVENTION

The present invention relates to the technical field of operating mobile radio telecommunication networks such as 3GPP Long Term Evolution (LTE) and Long Term Evolution Advanced (LTE-A) telecommunication networks. Specifically, the present invention relates to a method for providing radio access within a specific area of a mobile telecommunication network, wherein the specific area is served by at least one first base station being assigned to a first radio access technology and by at least one second base station being assigned to a second radio access technology, wherein compared to the second radio access technology the first radio access technology is a legacy radio access technology. Further, the present invention relates to a first base station and to a second base station, which, in connection with each other, are adapted to carry out the described method for providing radio access.

ART BACKGROUND

In recent years energy consumption has become a critical issue for mobile telecommunication networks. Telecommunication networks are continuously evolving for instance with the deployment of third generation (3G), High Speed Downlink Packet Access (HSDPA), High Speed Uplink Packet Access (HSUPA), LTE and LTE-A mobile telecommunication equipment. As a consequence a huge amount of energy is needed in order to operate all this radio equipment.

In the past main interest in research and standardization has been given to develop telecommunication equipment and digital radio transmission schemes that ensure higher spectral efficiencies and a better quality of service (QoS). Energy consumption has not been considered as a constraint so far. However with the currently started discussion in 3GPP and the consideration of study and work items focusing on network power saving this paradigm is likely to change.

According to recent discussions in 3GPP there should be defined solutions for energy saving from the perspective of radio access for the LTE-A network or E-UTRAN (Evolved Universal Terrestrial Radio Access Network). Within the framework of 3GPP currently the following principles should be followed when developing solutions for energy saving in LTE-A or E-UTRAN: (a) Energy saving solutions should be justified by valid radio scenario(s) and should be based on the actual load situation within the network and/or within the respective network cell which is considered for energy saving measures. (b) The accessibility of users respectively user equipments (UEs) should be guaranteed when a cell transfers to an energy saving mode. (c) Backward compatibility should be ensured. Specifically, the ability to provide energy savings for LTE release 10 system deployments should be ensured, which support a number of earlier release UEs.

Further, new energy saving mechanism should support the following load-dependent adaptation aspects: (a) It should be possible to switch on/off a particular Base Station (BS) respectively cell based on a monitoring of radio data traffic within the cell. (b) It should be further possible to perform a semi-static reconfiguration of transmission antenna numbers of a BS such as an evolved NodeB (eNB). This means that depending on the radio traffic and/or on the quality of radio connections between the BS and one or more UEs, one or more antennas together with the respective power amplifier can be switched on/off. In this respect semi-static means that the typical time scale for switching is in the order of one or more seconds. (c) Furthermore, in order to save energy it should be possible to perform a semi-static reconfiguration of the bandwidth for a control channel and a signal comprising a Common Reference Symbol (CRS). Again, semi-static means that the typical reconfiguration time is in the order of one or more seconds.

WO2009/140988A1 discloses a method for reducing a power consumption of a base station of a radio telecommunication network in a low load scenario. Specifically, within a sector of the telecommunication network the network can turn off entire transmitter chains comprising one or more base stations, whereas the respective receiver chains remain activated. This capability can be broadcasted together with a respective lifetime information defining the validity of the broadcasted message. In order to wake up base station downlink transmitters, a specific message transmitted on the Random Access Channel (RACH) is used, wherein this message comprises specific assigned preamble sequences.

Due to the continuous development of mobile telecommunication technology and the deployment of the corresponding mobile telecommunication equipment it is frequently the case that different Random Access Technology (RAT) communication devices are deployed in parallel. In this respect "deployment in parallel" means that within one and the same region different Random Access Technology (RAT) communication devices are available. Such a multi RAT deployment might be given for instance in regions where, even though there is already LTE or LTE-A radio access provided by new respectively non legacy base stations (BSs), there is still Global System for Mobile Communications (GSM) equipment in operation such as in particular GSM BSs in operation, which exclusively serve old respectively legacy UEs.

There may be a need for providing effective energy saving measures, which take benefit from the fact that within a specific region different RAT equipment is deployed.

SUMMARY OF THE INVENTION

This need may be met by the subject matter according to the independent claims. Advantageous embodiments of the present invention are described by the dependent claims.

According to a first aspect of the invention there is provided a method for providing radio access within a specific area of a mobile telecommunication network, wherein the specific area is served by at least one first base station being assigned to a first radio access technology and by at least one second base station being assigned to a second radio access technology. Compared to the second radio access technology the first radio access technology is a legacy radio access technology. The provided method comprises (a) determining the amount of radio data traffic within the specific area, (b) comparing the determined amount of radio data traffic with a first radio data traffic capacity, which can be provided by the at least one first base station, and (c) if the first radio data traffic capacity is larger than the determined amount of radio data traffic, (c1) transferring the at least one second base station into a predefined operational state, in which the at least one second base station has a reduced electric power consumption, which is smaller than the electrical power consumption being assigned to a full operation of the at least one second base station, and (c2) serving the specific area exclusively by the at least one first base station.

The described method is based on the idea that in case the overall data traffic capacity of all the deployed base stations within the specific area is not needed or at least temporarily not needed, legacy Radio Access Technology (RAT) base stations can be utilized (i) to serve the whole radio data traffic within the specified area and (ii) to provide the requested radio coverage. Non legacy RAT base stations can be transferred into a sleep mode or can be completely switched off. Thereby, the overall electrical power consumption of the multi RAT telecommunication network can be significantly reduced.

Generally speaking, by employing the described method the power consumption of a multi RAT telecommunication network, which comprises inter RAT redundancy with respect to the radio coverage within a specified area, can be reduced in a simple and effective manner. Thereby, the RAT redundancy is waived at least for some period of time, during which the requested amount of overall radio data traffic can be provided without using the radio data capacity of the at least one second base station.

In the described predefined operational state, which is characterized by the reduced electric power consumption of the at least one second base station, the at least one second base station can be completely switched off. In this case one has to make sure, that the switched off second base station(s) can be switched on again if the amount of radio data traffic increases such that a second data traffic capacity being assigned to the second base station(s) can no more be set aside. From a network power efficiency point of view of course a switch off of the second base station(s) would be most advantageous.

According to an embodiment of the invention transferring the at least one second base station into a predefined operational state is carried out in response to a configuration message, which is transferred to the at least one second base station.

The configuration message can be transferred to the at least one second base station for instance via a radio interface extending between the sender of the configuration message and the at least one second base station. The sender of the configuration message may be for instance any central network entity, which has knowledge about the determined amount of radio data traffic and about the first radio data traffic capacity and/or a second data radio data traffic capacity, which can be provided by the at least one second base station. In particular, the sender of the configuration message may be a so called Operation and Maintenance Center (OMC).

It is mentioned that in particular when the at least one second base station represents a component of a so called Self Organizing and Optimizing Network (SOON), the transfer into the predefined operational state can also be triggered by a base station autonomous decision.

According to a further embodiment of the invention the configuration message is transferred to the at least one second base station via non radio related signaling. This may provide the advantage that the described configuration message transfer does not contribute to the overall radio data traffic such that the signaling traffic can be kept within comparatively small limits. Preferably, the configuration message requesting the at least one second base station to go into the predefined operational state respectively the sleep mode may be transferred via a so called S1 interface, which may extend between the at least one second base station and a gateway connecting the at least one second base station to a core network.

Generally speaking, if the overall amount of radio data traffic within the specific area, which is covered by multi RAT base stations, can be handled without using the at least one second (non legacy) base station, the at least one second base station can be transferred to a sleep mode via a non radio related signaling, which is accomplished e.g. on the well known S1 interface.

According to a further embodiment of the invention the predefined operational state is a sleep mode. This may provide the advantage that in case of again upcoming UE originated radio data traffic, e.g. a data user intents to start a high data rate consuming session, the second base station(s) could be transferred quickly again to the normal operation. A time consuming and complex inter RAT related signaling task, which may be necessary in order to wake up or to recover full capability of the second base station(s) can be effectively avoided. Thereby, the flexibility of the overall multi RAT telecommunication network can be significantly improved, because the multi RAT telecommunication network can quickly adapt its configuration to a varying amount of radio data traffic within the specific area.

According to a further embodiment of the invention in the described sleep mode only a transmitter of the at least one second base station is switched off and a receiver of the at least one second base station is still at least partially active. This may provide the advantage that the at least one second base station can be easily woken up or recovered from its predefined operational state, which is associated with the reduced electrical power consumption.

Further, a sleep mode being characterized with an at least partially active receiver may allow for realizing a wake up procedure, wherein a time delay and a complex inter RAT network related signaling can be effectively avoided.

According to a further embodiment of the invention the at least partially active receiver of the at least one second base station is operated in a mode being assigned to the first radio access technology. This may provide the advantage that the at least one second base station can be woken up by receiving a radio signal, which can be transmitted by any backward compatible network element of the multi RAT radio telecommunication network. In this context it is taken into account that any backward compatible network element being assigned to the non legacy second RAT should also be capable of handling data signals in accordance with specifications of the first RAT.

Specifically, the receiver of the at least one second base station may be operated with a radio transmission resource, which is usually assigned to Downlink (DL) radio transmissions in the framework of the first RAT. This may provide the advantage that when being in the sleep mode the at least one second base station can be easily woken up by legacy and backward compatible non legacy network elements in a reliable manner. In this respect it is mentioned that in this case it will not be necessary that the at least one sleeping second base station will have to follow all Uplink (UL) radio traffic, which might be transmitted by one or more user equipments (UEs) towards a fully operating first base station, which is assigned to the first RAT and which might be employed in the neighborhood of the respective second base station, in order to identify a possible wake up signal.

According to a further embodiment of the invention before transferring the at least one second base station into the predefined operational state, the at least one second base station receives a first inter radio access technology information, which comprises information about the type and the radio frequency of the first radio access technology.

Descriptive speaking, the information about the type of the first RAT identifies the legacy RAT, which in case of a comparatively small amount of radio data traffic within the specific area is fully kept in operation.

The information about the radio frequency of the first RAT may comprise for instance the carrier frequency and the bandwidth of the first RAT and/or a radio channel information of the first RAT.

According to a further embodiment of the invention before transferring the at least one second base station into the predefined operational state, the at least one second base station receives a second inter radio access technology information, which comprises a unique identification for each of the at least one second base station within a first part of the mobile telecommunication network, which part is exclusively assigned to the first radio access technology.

This may mean that a sleeping second base station is at least temporarily assigned to the first part respectively the first RAT part of the mobile telecommunication network. This may allow for an easy and effective wake up procedure in case the radio data capacity of the at least one second base station will be needed again.

Preferably, the unique identification may be for instance a Mobile Subscriber Integrated Services Digital Network (MSISDN) number.

Based on the described unique identification the at least one second (non legacy) base station can tune its receiver in order to receive on the radio transmission resources of the first (legacy) RAT in the same manner as a legacy RAT UE would do.

According to a further embodiment of the invention the first radio access technology is GSM or UMTS and/or the second radio access technology is LTE. This may provide the advantage that the described method can be carried out with RATs, which are widely used. As a consequence, the described method can be effectively used for power saving in many presently or in the future existing multi RAT deployments.

According to a further embodiment of the invention the method further comprises (a) again determining the amount of radio data traffic within the specific area, (b) comparing the again determined amount of radio data traffic with the first radio data traffic capacity, and (c) if the first radio data traffic capacity is smaller than the again determined amount of radio data traffic, (c1) transferring the at least one second base station back to an initial operational state providing full operation of the at least one second base station, and (c2) serving the specific area at least partially by the at least one second base station.

In other words, if the first (legacy) RAT system detects an increasing radio data traffic, i.e. a high load, the first (legacy) RAT system may initiate a wake up for the at least one second (non legacy) base station. As has already been described above, this wake up can be performed by a radio signaling on radio transmission resources being assigned to the first (legacy) RAT.

After having left the predefined operational state respectively the sleep mode the at least one second (non legacy) base station can behave again like conventional non legacy base station.

After a wake up of the at least one second base station the specific area may be served exclusively with the at least one second base station. It is mentioned that this will be a rare case because this would require that there are only UEs located within the specific area, which support the second (non legacy) RAT. The preferably and much more likely scenario is that after having been transferred again to usual operation the at least one second base station together with the at least one first base stations serve UEs being located within the specific area.

According to a further embodiment of the invention transferring the at least one second base station back to an initial operational state is carried out in response to a wake up message, which is transferred to the at least one second base station.

The wake up message can be transferred for instance by means of a paging signal. The paging signal can be broadcasted to the sleeping at least one second base station in a known manner over the air interface e.g. the first (legacy) RAT air interface. After having received the wake up message the at least one second base station may be reactivated very fast and continues with the second RAT operation.

It is mentioned that the wake up message can also be transferred to the at least one second base station in a different manner. Such a different manner can be for instance a Short Message Service (SMS) message e.g. utilizing the first (legacy) RAT air interface.

For waking up the at least one second base station the above described unique identification (e.g. MSISDN) of the respective second base station within the framework of the legacy network may be used for addressing the wake up message.

According to a further aspect of the invention there is described a first base station for providing radio access within a specific area of a mobile telecommunication network, wherein the specific area is served by at least the first base station being assigned to a first radio access technology and by at least one second base station being assigned to a second radio access technology, wherein compared to the second radio access technology the first radio access technology is a legacy radio access technology. The described first base station comprises (a) a receiving unit for receiving a report message, which indicates that in response to a network scenario, in which a determined amount of radio data traffic within the specific area is smaller than a first radio data traffic capacity which can be provided (if applicable together with other first base station(s) being assigned to the first radio access technology) by the first base station, the at least one second base station has been transferred into a predefined operational state, in which the at least one second base station has a reduced electric power consumption, which is smaller than the electrical power consumption being assigned to a full operation of the at least one second base station, and (b) a transceiver unit, which is adapted for exclusively serving the specific area (if applicable together with other first base station(s) being assigned to the first radio access technology) by employing only the first radio access technology.

According to a further aspect of the invention there is described a second base station for providing radio access within a specific area of a mobile telecommunication network, wherein the specific area is served by at least one first base station being assigned to a first radio access technology and by at least the second base station being assigned to a second radio access technology, wherein compared to the second radio access technology the first radio access technology is a legacy radio access technology. The described second base station comprises (a) a receiving unit for receiving a configuration message, which indicates that a determined amount of radio data traffic within the specific area is smaller than a first radio data traffic capacity, which can be provided by the at least one first base station, and (b) a switching unit, which is adapted to switch, in response to a reception of the configuration message, the operational state of the second base station from an initial operational state to a predefined operational state, in which the second base station has a smaller electric power consumption than in the initial operational state. Thereby, when the second base station is in the predefined operational state, the specific area is exclusively served by the at least one first base station.

Also the described first base station and the described second base station are based on the idea that a significant reduction of the power consumption of the second base station can be realized by transferring the second base station into the predefined operational state, which is characterized (a) by the fact that the second base station can no longer contribute for serving UEs being located within the specific area and (b) by a reduced power consumption of the second base station. From an overall power consumption perspective this predefined operational state of the second base station may be beneficial, if the at least on first base station, if applicable together with other first base station(s) being assigned to the first radio access technology, is capable of completely serving the specific area. In other words, when the second base station is not really needed for providing radio access within the specific area because the at least on first base station comprises sufficient radio data traffic capacity, the second base station can be deactivated or transferred into a sleep mode at least temporarily.

According to a further aspects of the invention there may be provided a computer program for providing radio access within a specific area of a mobile telecommunication network, wherein the specific area is served by at least one first base station being assigned to a first radio access technology and by at least one second base station being assigned to a second radio access technology, wherein compared to the second radio access technology the first radio access technology is a legacy radio access technology. The computer program, when being executed by a data processor, is adapted for controlling and/or for carrying out the above described method for providing radio access within a multi RAT telecommunication network.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the example of embodiment to be described hereinafter and are explained with reference to the example of embodiment. The invention will be described in more detail hereinafter with reference to the example of embodiment but to which the invention is not limited.

BRIEF DESCRIPTION OF THE DRAWING

The FIGURE shows in accordance with an embodiment of the invention a transactional flow diagram illustrating a message flow within a telecommunication network, which operates with two different Radio Access Technologies (RATS).

DETAILED DESCRIPTION

The FIGURE shows a transactional flow diagram within a telecommunication network 100, which operates both with a first Radio Access Technology (RAT) and with a second RAT. Compared to the second RAT the first RAT is a legacy RAT. Due to a backward compatibility all network entities and in particular all base stations, which are assigned to the second RAT, are also capable of being operated with the first RAT.

According to the embodiment described here the first RAT is Global System for Mobile Communication (GSM) and the second RAT is Long Term Evolution (LTE) or Long Term Evolution Advanced (LTE-A). Most of the network entities of the telecommunication network 100 can be assigned either to the first RAT or alternatively to the second RAT. Therefore, in a schematic illustration the multi RAT telecommunication network 100 comprises as sub-networks a GSM network 110 and a LTE network 120. A GSM base station 112 is assigned to the GSM network 110. An Operation and Maintenance Center 125 is assigned to the LTE network 120.

Depending on the radio data traffic load within the telecommunication network 100 or within a specified area of the telecommunication network 100 there might occur the situation, that the amount of radio data traffic is smaller than a first radio data traffic capacity, which can be provided by the GSM network 110 (including the GSM base station 112). In this situation the power consumption of the telecommunication network 100 can be reduced by transferring the LTE network 120 or at least one or more base stations (eNBs) of the LTE network 120 into a sleep mode, whereby the specified area, which has before being served both by the GSM network 110 and by the LTE network 120, is being served only by the (legacy) GSM network 110.

According to the embodiment described here the sleep mode of the LTE network 120 or one or more base stations of the LTE network 120 is characterized by a still active but reconfigured receiver of the respective second RAT base station (LTE eNB) and by a switched off transmitter of the respective LTE eNB.

In the following a message flow for effectively realizing such a sleep mode scenario is described: As has already been described above the sleep mode activation is only triggered in a specific low load network scenario. Therefore, the amount of radio data traffic within the specific area has be monitored and compared with a first radio data traffic capacity, which can be provided by GSM network 110. This monitoring and this comparing, which are not explicitly depicted in the FIGURE, can be accomplished by any entity of the telecommunication network 100. According to the embodiment described here the monitoring and the comparing is accomplished by the Operation and Maintenance Center 125.

If the Operation and Maintenance Center 125 finds out, that the current radio data traffic could be handled without the LTE network 120, it will transmit a configuration message 152 to the LTE network 100 or at least to one or more eNBs of the LTE network 100. This configuration message 152 comprises information about the GSM network 110 such as the frequency band (here 1900 MHz) and a network identification (NW ID). With this message 152 the Operation and Maintenance Center 125 tells the respective eNB how its receiver should behave during the sleep mode. Specifically, during the sleep mode the transmitter of the respective LTE eNB is switched off and the receiver of the respective LTE eNB has to behave like a GSM receiver.

After having received this information the LTE network 120 respectively the eNB(s) of the LTE network 120 transmit a report message 154 to the GSM network 110. With this message 154 the respective LTE eNB informs the GSM network that it is willing to go into the above described sleep mode (switched off transmitter, active but reconfigured receiver).

According to the embodiment described here the report message 154 comprises a Global Cell Identifier of the respective eNB and the already above mentioned network identification (NW ID). With this report message 154 the GSM network is informed that at least one eNB of the LTE network 120 will go into the sleep mode such that the GSM network 110 will be alone responsible for serving the specified area of the telecommunication network 100.

In response to the reception of the report message 154 the GSM network will transmit a receiver configuration message 156. According to the embodiment described here this message 156 comprises an LTE Global Cell Identifier (GCID) and a Mobile Station Identification (MSID) number, which is assigned to the respective eNB, which is supposed to go into the sleep mode. The MSID is the number under which the respective sleeping eNB of the LTE network 120 can be reached within the first RAT respectively within the framework of the GSM network 110.

After having received the report message 154, the LTE network 120 respectively at least one LTE eNB of the LTE network 120 goes into the above described sleep mode. During the sleep mode all the radio data traffic within the specified area of the telecommunication network 100 is handled exclusively by the GSM network 110.

If it turns out that the amount of radio traffic increases such that it cannot be handled exclusively by the GSM network 110 alone, the LTE network 120 respectively the at least one eNB of the LTE network 120 can be transferred again to normal operation. According to the embodiment described here this is accomplished by a wake up message 158, which is transmitted from the GSM base station 112 to the still active and reconfigured receiver of the sleeping eNB of the LTE network 120. As can be seen from the FIGURE, according to the embodiment described here the wake up signal is transmitted via a paging message, which comprises the already above mentioned MSID.

It is mentioned that the wake up message 158 can also be transferred in a different manner such as for instance via a Short Message Service (SMS) message, which also relies on the above described MSID of the sleeping eNB.

After having received and processed the wake up message the eNB of the LTE network 120 transfers again to the normal mode. In the following the specified area of the telecommunication network 100 will again be served both by the GSM network 110 and by the LTE network 120.

Of course, if the amount of radio data traffic again decreases below the capacity of the GSM network 110, the above described procedure for transferring at least one eNB of the LTE network 120 into the sleep mode may be started again.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 multi RAT telecommunication network
110 GSM network
112 GSM base station
120 LTE network
125 Operation and Maintenance Center
152 configuration message
154 report message
156 receiver configuration message
158 wake up message

The invention claimed is:

1. A method comprising:
determining the amount of radio data traffic within a specific area of a mobile telecommunication network,
   wherein the specific area is served by at least one first base station being assigned to a first radio access technology and by at least one second base station being assigned to a second radio access technology, and
   wherein compared to the second radio access technology the first radio access technology is a legacy radio access technology;
comparing the determined amount of radio data traffic with a first radio data traffic capacity, which can be provided by the at least one first base station;
if the first radio data traffic capacity is larger than the determined amount of radio data traffic, transferring the at least one second base station into a predefined operational state, in which the at least one second base station has a reduced electric power consumption, which is smaller than the electrical power consumption being assigned to a full operation of the at least one second base station,
   wherein transferring the at least one second base station into a predefined operational state is carried out in response to a configuration message,
   wherein the predefined operational state is a sleep mode,
   wherein the configuration message comprises information about the network such as frequency bad and network identification, and
   wherein before transferring the at least one second base station into the predefined operational state, the at least one second base station receives
      a first inter radio access technology information, which comprises information about the type and the radio frequency of the first radio access technology, and
      a second inter radio access technology information, which comprises a unique identification for each of the at least one second base station within a first part of the mobile telecommunication network, which part is exclusively assigned to the first radio access technology; and serving the specific area exclusively by the at least one first base station.

2. The method as set forth in claim 1, wherein transferring the at least one second base station into a predefined operational state is carried out in response to a configuration message, which is transferred to the at least one second base station.

3. The method as set forth in claim 2, wherein the configuration message is transferred to the at least one second base station via non radio related signaling.

4. The method as set forth in claim 1, wherein in the sleep mode only a transmitter of the at least one second base station is switched off and a receiver of the at least one second base station is still at least partially active.

5. The method as set forth in claim 4, wherein the at least partially active receiver of the at least one second base station is operated in a mode being assigned to the first radio access technology.

6. The method as set forth in claim 1, wherein the first radio access technology is GSM or UMTS or the second radio access technology is LTE or the first radio access technology is GSM or UMTS and the or the second radio access technology is LTE.

7. The method as set forth in claim 1, further comprising
again determining the amount of radio data traffic within the specific area,
comparing the again determined amount of radio data traffic with the first radio data traffic capacity, and
if the first radio data traffic capacity is smaller than the again determined amount of radio data traffic,
transferring the at least one second base station back to an initial operational state providing full operation of the at least one second base station, and
serving the specific area at least partially by the at least one second base station.

8. The method as set forth in claim 7, wherein transferring the at least one second base station back to an initial operational state is carried out in response to a wake up message, which is transferred to the at least one second base station.

9. An apparatus comprising at least one processor and at least one memory including computer program code, wherein the at least one memory and the computer code are configured, with the at least one processor, to cause the apparatus to at least perform the following:
providing radio access within a specific area of a mobile telecommunication network, wherein the specific area is served by at least the apparatus being assigned to a first radio access technology and by at least one second base station being assigned to a second radio access technology, wherein compared to the second radio access technology the first radio access technology is a legacy radio access technology,
receiving a report message which indicates that in response to a network scenario at least one second base station has been transferred into a predefined operational state,
wherein the network scenario comprises a determined amount of radio data traffic within the specific area as being smaller than a first radio data traffic capacity,
wherein the network scenario can be provided by the first base station,
wherein the predefined operational state comprises the at least one second base station as having a reduced electric power consumption,
wherein the predefined operational state is a sleep mode,
wherein the reduced electric power consumption is smaller than the electrical power consumption assigned to a full operation of the at least one second base station, and
wherein before transferring the at least one second base station into the predefined operational state, the at least one second base station receives
a first inter radio access technology information, which comprises information about the type and the radio frequency of the first radio access technology, and
a second inter radio access technology information, which comprises a unique identification for each of the at least one second base station within a first part of the mobile telecommunication network, which part is exclusively assigned to the first radio access technology; and
transmitting and receiving exclusively in the specific area by employing only the first radio access technology.

10. An apparatus comprising at least one processor and at least one memory including computer program code, wherein the at least one memory and the computer code are configured, with the at least one processor, to cause the apparatus to at least perform the following:
providing radio access within a specific area of a mobile telecommunication network, wherein the specific area is served by at least one first base station being assigned to a first radio access technology and by at least the apparatus being assigned to a second radio access technology, wherein compared to the second radio access technology the first radio access technology is a legacy radio access technology;
receiving a configuration message indicating that a determined amount of radio data traffic within the specific area is smaller than a first radio data traffic capacity, wherein the first radio data traffic capacity can be provided by the at least one first base station; and
switching, in response to a reception of the configuration message, the operational state of the apparatus from an initial operational state to a predefined operational state,
wherein in the predefined operational state the apparatus has a smaller electric power consumption than in the initial operational state,
wherein transferring the at least one second base station into a predefined operational state is carried out in response to a configuration message,
wherein the predefined operational state is a sleep mode,
wherein the configuration message comprises information about the network such as frequency bad and network identification, and
wherein before transferring the at least one second base station into the predefined operational state, the at least one second base station receives
a first inter radio access technology information, which comprises information about the type and the radio frequency of the first radio access technology,
a second inter radio access technology information, which comprises a unique identification for each of the at least one second base station within a first part of the mobile telecommunication network, which part is exclusively assigned to the first radio access technology, and
wherein, when the apparatus is in the predefined operational state, the specific area is exclusively served by the at least one first base station.

11. A computer program product embodied on a non-transitory computer-readable medium in which a computer program is stored that, when being executed by a computer, is configured to provide instructions to control or carry out the method of claim 1.

\* \* \* \* \*